(12) United States Patent
Owens

(10) Patent No.: US 11,976,490 B2
(45) Date of Patent: May 7, 2024

(54) SKIMMER COVER ASSEMBLY

(71) Applicant: Blue Square Manufacturing, LLC, Chandler, AZ (US)

(72) Inventor: Jeremy Owens, Mesa, AZ (US)

(73) Assignee: Blue Square Manufacturing, LLC, Chandler, AZ (US)

( * ) Notice: Subject to any disclaimer, the term of this patent is extended or adjusted under 35 U.S.C. 154(b) by 198 days.

(21) Appl. No.: 17/570,506

(22) Filed: Jan. 7, 2022

(65) Prior Publication Data
US 2023/0220693 A1 Jul. 13, 2023

(51) Int. Cl.
*E04H 4/12* (2006.01)
*C02F 1/40* (2023.01)
*C02F 1/68* (2023.01)
*C02F 103/42* (2006.01)

(52) U.S. Cl.
CPC ............ *E04H 4/1272* (2013.01); *C02F 1/40* (2013.01); *C02F 1/68* (2013.01); *C02F 2103/42* (2013.01)

(58) Field of Classification Search
None
See application file for complete search history.

(56) References Cited

U.S. PATENT DOCUMENTS

| | | | | |
|---|---|---|---|---|
| 2,658,625 A | * | 11/1953 | Rafferty | B01D 35/02 210/497.3 |
| 2,900,079 A | * | 8/1959 | Pace | F04D 29/708 210/416.2 |
| 2,960,232 A | * | 11/1960 | Gillette | B01D 29/21 210/167.13 |
| 2,980,256 A | * | 4/1961 | Nash | B01D 29/52 210/167.13 |
| 3,000,508 A | * | 9/1961 | Spaulding | E04H 4/1645 210/477 |
| 3,285,420 A | * | 11/1966 | Muller | B01D 29/11 210/315 |
| 3,297,163 A | * | 1/1967 | Landon | B01D 29/6446 210/167.14 |
| 3,306,448 A | * | 2/1967 | Baker | B01D 37/04 137/430 |
| 3,481,470 A | * | 12/1969 | Valois | B01D 29/41 210/167.14 |

(Continued)

FOREIGN PATENT DOCUMENTS

| | | |
|---|---|---|
| AU | 2014100682 | 7/2014 |
| WO | WO-2023023788 A1 * | 3/2023 |

*Primary Examiner* — Robert J Popovics
(74) *Attorney, Agent, or Firm* — Miller Johnson

(57) ABSTRACT

A skimmer assembly includes a housing, a base member, and a carriage. The housing includes a plurality of walls defining a chamber. The base member includes a first sidewall and a first hub. The first sidewall extends from an upper surface of the base member. The first hub extends from a lower surface of the base member. The lower surface is opposite the upper surface. The base member is configured to receive the housing such that the first sidewall at least partially surrounds the housing. The carriage includes a second sidewall and a second hub. The second sidewall extends from an upper surface of the carriage. The first hub extends from a lower surface of the carriage opposite the upper surface of the carriage. The first hub is configured to rotatably receive the second hub.

12 Claims, 4 Drawing Sheets

(56) References Cited

U.S. PATENT DOCUMENTS

| | | | | |
|---|---|---|---|---|
| 3,567,020 A | * | 3/1971 | Whitaker | E04H 4/1272 210/94 |
| 3,567,025 A | * | 3/1971 | Gillette | C02F 1/006 210/540 |
| 3,616,916 A | * | 11/1971 | Greene | E04H 4/1272 210/121 |
| 3,620,372 A | * | 11/1971 | Ehret | E04H 4/1272 210/167.1 |
| 3,628,664 A | * | 12/1971 | Stanwood | E04H 4/1272 210/167.1 |
| 3,677,408 A | * | 7/1972 | Dinizo, Jr. | E04H 4/1272 210/167.11 |
| 3,701,427 A | * | 10/1972 | Howard | E04H 4/1209 210/167.1 |
| 3,706,379 A | * | 12/1972 | Erlich | E04H 4/1272 210/123 |
| 3,765,534 A | * | 10/1973 | West | E04H 4/1272 210/206 |
| 3,792,499 A | * | 2/1974 | Whitaker | E04H 4/1272 4/512 |
| 3,815,161 A | * | 6/1974 | Baker | E04H 4/1272 4/512 |
| 3,831,897 A | * | 8/1974 | Stegmeier | E04H 4/1272 249/145 |
| 3,841,487 A | * | 10/1974 | Villette | E04H 4/1272 210/123 |
| 3,856,679 A | * | 12/1974 | Jackson | E04H 4/1272 210/471 |
| 3,910,840 A | * | 10/1975 | Adam | E04H 4/1272 210/91 |
| 3,939,505 A | * | 2/1976 | Gross | E04H 4/1272 4/512 |
| 4,022,690 A | * | 5/1977 | Smith | E04H 4/1272 210/249 |
| 4,126,925 A | * | 11/1978 | Jacuzzi | E04H 4/1272 4/490 |
| 4,154,679 A | * | 5/1979 | Farage | E04H 4/1272 210/407 |
| 4,212,740 A | * | 7/1980 | Greene | E04H 4/1272 210/242.1 |
| 4,325,462 A | * | 4/1982 | Gouzos | E04H 4/1272 4/488 |
| 4,348,281 A | * | 9/1982 | Perry | E04H 4/1272 210/163 |
| 4,426,286 A | * | 1/1984 | Puckett | E04H 4/1272 210/121 |
| 4,454,035 A | * | 6/1984 | Stefan | E04H 4/1272 210/123 |
| 4,501,659 A | * | 2/1985 | Henk | E04H 4/1272 417/90 |
| 4,637,873 A | * | 1/1987 | DeSousa | E04H 4/1272 210/232 |
| 4,707,253 A | * | 11/1987 | Rowe | E04H 4/1272 210/232 |
| 4,725,352 A | * | 2/1988 | Haliotis | E04H 4/1272 137/625.3 |
| 4,737,279 A | * | 4/1988 | Lewis | E04H 4/1272 134/167 R |
| 4,740,307 A | * | 4/1988 | Buelteman | E04H 4/1645 210/232 |
| 4,743,368 A | * | 5/1988 | Gates | E04H 4/1272 210/136 |
| 4,776,908 A | * | 10/1988 | Sapp | E04H 4/1272 156/330 |
| 4,776,953 A | * | 10/1988 | Frentzel | E04H 4/1272 134/167 R |
| 4,798,670 A | * | 1/1989 | Treene | E04H 4/1272 210/416.2 |
| 4,818,389 A | * | 4/1989 | Tobias | E04H 4/1272 417/186 |
| 4,826,591 A | * | 5/1989 | Macia | E04H 4/1272 4/512 |
| 4,876,001 A | * | 10/1989 | Supra | E04H 4/1272 137/433 |
| 4,879,772 A | * | 11/1989 | Meloney, Jr. | E04H 4/1272 210/167.1 |
| 4,913,810 A | * | 4/1990 | Hodak | E04H 4/1272 4/496 |
| 5,124,032 A | * | 6/1992 | Newhard | C02F 1/688 210/206 |
| 5,154,821 A | * | 10/1992 | Reid | E04H 4/12 4/496 |
| 5,181,283 A | * | 1/1993 | Gillebaard | E04H 4/1272 4/496 |
| 5,202,020 A | * | 4/1993 | Desjoyaux | B01D 29/35 4/490 |
| 5,225,075 A | * | 7/1993 | Cunningham | E04H 4/1272 4/496 |
| 5,234,588 A | * | 8/1993 | Aymes | B01F 21/22 210/206 |
| 5,285,538 A | * | 2/1994 | Hodak | E04H 4/1272 220/241 |
| 5,352,358 A | * | 10/1994 | Davey | E04H 4/1645 4/496 |
| 5,554,277 A | * | 9/1996 | Rief | B01D 29/117 210/232 |
| 5,581,826 A | * | 12/1996 | Edwards | E04H 4/1645 4/507 |
| 5,604,939 A | * | 2/1997 | Widener | E04H 4/1272 4/496 |
| 5,605,622 A | * | 2/1997 | Ferraro | E04H 4/1654 210/420 |
| 5,750,022 A | * | 5/1998 | Blake | E04H 4/1636 210/406 |
| 5,753,112 A | * | 5/1998 | Barnes | E04H 4/1272 4/507 |
| 5,785,846 A | * | 7/1998 | Barnes | E04H 4/1272 4/490 |
| 5,862,541 A | * | 1/1999 | Mailhot | A01K 29/00 119/221 |
| 5,879,547 A | * | 3/1999 | Desjoyaux | B01D 35/26 210/195.1 |
| 5,888,386 A | * | 3/1999 | Enright | C02F 1/688 210/232 |
| 5,935,450 A | * | 8/1999 | Benedict | E04H 4/1272 210/776 |
| 6,007,714 A | * | 12/1999 | Keith | E04H 4/1272 210/474 |
| 6,022,481 A | * | 2/2000 | Blake | E04H 4/1645 210/776 |
| 6,071,403 A | * | 6/2000 | Usher | E04H 4/1272 4/496 |
| 6,080,324 A | * | 6/2000 | Pleva | E04H 4/1209 210/791 |
| RE36,913 E | * | 10/2000 | Ferraro | E04H 4/1645 210/420 |
| 6,136,206 A | * | 10/2000 | Butcher | E03F 5/14 210/776 |
| 6,180,017 B1 | * | 1/2001 | Usher | B01D 35/02 210/791 |
| 6,393,628 B1 | * | 5/2002 | Kellogg | F16K 1/2021 4/496 |
| 6,471,856 B1 | * | 10/2002 | Keith | B01D 29/21 210/489 |
| 6,572,765 B2 | * | 6/2003 | Lincke | E04H 4/1272 210/232 |
| 6,592,756 B1 | * | 7/2003 | Felix, Jr. | E04H 4/14 210/477 |
| 6,685,843 B2 | * | 2/2004 | Leaverton | B01D 29/27 210/485 |
| 6,701,542 B2 | * | 3/2004 | Marbach | E04H 4/1272 4/490 |
| 6,706,174 B1 | * | 3/2004 | Keith | B01D 29/01 210/489 |
| 6,716,342 B1 | * | 4/2004 | Tilsner | E04H 4/1272 210/232 |
| 6,755,967 B2 | * | 6/2004 | Voll | B01D 19/0005 210/170.07 |

(56) References Cited

U.S. PATENT DOCUMENTS

| | | | | |
|---|---|---|---|---|
| 6,770,193 B2* | 8/2004 | Foley | ................... | E04H 4/1272 4/496 |
| 6,797,164 B2* | 9/2004 | Leaverton | ............. | B01D 29/27 210/485 |
| 6,830,680 B2* | 12/2004 | Queirel | ................ | E04H 4/1272 137/602 |
| 6,878,266 B2* | 4/2005 | Leaverton | ............... | C02F 1/004 220/495.11 |
| 6,893,557 B2* | 5/2005 | Harris-Griffin | ....... | E04H 4/1272 210/416.2 |
| 6,939,463 B2* | 9/2005 | Leaverton | ............... | C02F 1/004 220/495.11 |
| 6,962,660 B2* | 11/2005 | Wybo | .................... | C02F 1/004 210/489 |
| 6,966,079 B2* | 11/2005 | Stetson | ................ | E04H 4/1272 4/512 |
| 7,011,747 B2* | 3/2006 | Hodak | .................. | E04H 4/1272 210/232 |
| 7,052,612 B2* | 5/2006 | Kelty | .................... | E04H 4/1272 210/776 |
| 7,076,813 B2* | 7/2006 | Stetson | ................ | E04H 4/1272 4/512 |
| 7,144,515 B2* | 12/2006 | Brosemer | ............. | E04H 4/1272 210/512.1 |
| 7,207,604 B2* | 4/2007 | Wilson | ................... | E04H 4/1245 285/305 |
| 7,300,576 B1* | 11/2007 | Blake | ................... | E04H 4/1272 4/507 |
| 7,309,443 B2* | 12/2007 | Kelty | ................... | C02F 1/325 210/776 |
| 7,311,821 B2* | 12/2007 | Queirel | ................... | E04H 4/169 210/232 |
| 7,384,544 B2* | 6/2008 | Meincke | ................. | C02F 1/001 4/507 |
| 7,390,401 B2* | 6/2008 | Hodak | .................. | E04H 4/1272 210/232 |
| 7,402,242 B2* | 7/2008 | Duckett | ................ | E04H 4/1272 210/167.14 |
| 7,407,575 B2* | 8/2008 | Braun | ................ | B01D 35/0276 210/175 |
| 7,451,500 B2* | 11/2008 | Baker, Jr. | ............... | E04H 4/1272 4/496 |
| 7,550,078 B2* | 6/2009 | Meagher | ............... | E04H 4/1272 4/496 |
| 7,563,365 B2* | 7/2009 | Pellington | ............. | E04H 4/1272 4/507 |
| 7,699,983 B2* | 4/2010 | Andrei | .................. | E04H 4/1272 210/232 |
| 7,727,387 B2* | 6/2010 | Goggin | ................. | E04H 4/1272 210/136 |
| 7,815,795 B2* | 10/2010 | Parks | ................... | E04H 4/1272 210/232 |
| 7,815,797 B1* | 10/2010 | Keith | .................... | E04H 4/1272 210/477 |
| 7,862,712 B2* | 1/2011 | Tak | ....................... | E04H 4/1663 210/167.13 |
| 7,914,009 B1 | 3/2011 | Gerspach | | |
| 7,993,515 B2* | 8/2011 | Davies | ................... | E04H 4/1272 210/167.2 |
| 8,091,934 B2* | 1/2012 | Bair | ..................... | E04H 4/1272 294/24 |
| 8,136,176 B2* | 3/2012 | Shebek | ................. | E04H 4/1272 4/496 |
| 8,555,989 B1 | 10/2013 | Agajanian | ................ | E04H 4/1272 169/5 |
| 8,689,369 B2* | 4/2014 | Nelson | ................. | E04H 4/1281 210/167.17 |
| 8,721,881 B1* | 5/2014 | Smith | .................... | C02F 1/001 210/232 |
| 8,820,355 B2* | 9/2014 | Sutton | ............... | F16K 31/52483 137/119.07 |
| 8,864,986 B1* | 10/2014 | Smith | ................... | E04H 4/1272 210/232 |
| 9,194,148 B1* | 11/2015 | Koller | ....................... | E04H 4/06 |
| 9,260,878 B2* | 2/2016 | Zars | ........................ | E04H 4/1272 |
| 9,284,742 B1* | 3/2016 | Deckard | ................ | E04H 4/105 |
| 9,347,234 B2* | 5/2016 | Voss Weyman | ...... | E04H 4/1272 |
| 9,428,929 B2* | 8/2016 | Prendergast | ........... | E04H 4/1272 |
| 9,447,595 B1* | 9/2016 | Goettl | ....................... | E04H 4/1272 |
| 9,453,354 B1* | 9/2016 | Goettl | ....................... | E04H 4/1272 |
| 9,476,214 B2* | 10/2016 | Parks | ........................ | E04H 4/14 |
| 9,539,529 B2* | 1/2017 | Mullis | ................... | B01D 35/02 |
| 9,581,478 B1* | 2/2017 | Smith | ................... | E04H 4/1272 |
| 9,593,500 B1* | 3/2017 | Goettl | .................... | E04H 4/1272 |
| 9,663,964 B2* | 5/2017 | Kurani | .................... | B01D 29/27 |
| 9,761,990 B2* | 9/2017 | Koller | ................. | H01R 13/648 |
| 9,822,540 B2* | 11/2017 | Baab | ................... | E04H 4/1272 |
| 9,874,037 B1* | 1/2018 | Goettl | .................... | E04H 4/1272 |
| 9,890,547 B1* | 2/2018 | Sirco | ................... | E04H 4/1272 |
| 9,896,855 B2* | 2/2018 | Angelino | ............. | E04H 4/1272 |
| 9,932,747 B2* | 4/2018 | Greenwald | ........... | E04H 4/1272 |
| 9,945,141 B2* | 4/2018 | Goettl | ...................... | C02F 1/001 |
| 10,036,174 B2* | 7/2018 | Smith | ................... | E04H 4/1263 |
| 10,132,096 B2* | 11/2018 | Smith | ................... | E04H 4/1272 |
| 10,138,644 B1* | 11/2018 | Piepenburg | ............. | E04H 4/141 |
| 10,161,151 B2* | 12/2018 | Goettl | .................... | E04H 4/1272 |
| 10,214,931 B2* | 2/2019 | Saccoccio | ............. | B01D 29/31 |
| 10,378,228 B2* | 8/2019 | Huang | ................ | B01D 35/301 |
| 10,399,016 B2* | 9/2019 | Angelino | ............. | E04H 4/1272 |
| 10,443,257 B2* | 10/2019 | Greenwald | ........... | E04H 4/1272 |
| 10,465,405 B2* | 11/2019 | Pain | ...................... | E04H 4/1272 |
| 10,526,808 B2* | 1/2020 | Smith | ....................... | C02F 1/001 |
| 10,662,666 B2* | 5/2020 | Jackson | .................... | C02F 1/40 |
| 10,731,367 B1* | 8/2020 | Willwater | ............. | E04H 4/1272 |
| 10,816,528 B2* | 10/2020 | Yizhack | ............... | G01N 21/15 |
| 10,835,846 B1 | 11/2020 | Carpenter | | |
| 10,837,189 B2* | 11/2020 | Vogtner | ................ | E04H 4/1272 |
| 10,851,555 B1* | 12/2020 | Willwater | ............. | E04H 4/1272 |
| 10,876,311 B1* | 12/2020 | Schmidt | ................ | E04H 4/1272 |
| 10,876,312 B1* | 12/2020 | Schmidt | ................ | E04H 4/1272 |
| 10,876,313 B1* | 12/2020 | Schmidt | ................ | E04H 4/1272 |
| 10,876,314 B1* | 12/2020 | Sirco | ................... | E04H 4/1272 |
| 10,890,005 B2* | 1/2021 | Ramos | ................ | E04H 4/1272 |
| 10,920,439 B2* | 2/2021 | Jackson | ................ | E04H 4/1272 |
| 10,961,737 B2* | 3/2021 | Jackson | ................ | E04H 4/1272 |
| 11,072,935 B1* | 7/2021 | Yu | ........................ | E04H 4/1272 |
| 11,193,289 B2* | 12/2021 | Ocegueda | ............. | E04H 4/1272 |
| 11,248,385 B2* | 2/2022 | Willwater | ............. | E04H 4/1272 |
| 11,331,616 B2* | 5/2022 | Henderson | ............. | B01D 29/58 |
| 11,332,950 B2* | 5/2022 | Schmidt | ................ | E04H 4/1263 |
| 11,524,252 B2* | 12/2022 | Aquilina | ............... | E04H 4/1272 |
| 11,554,333 B2* | 1/2023 | Farley | .................... | B01D 35/26 |
| 11,643,833 B2* | 5/2023 | Barnes | ................ | E04H 4/1272 210/167.1 |
| 11,725,407 B2* | 8/2023 | Schmidt | ................ | E04H 4/1272 210/167.1 |
| 2002/0117432 A1* | 8/2002 | Lincke | ................... | B01D 29/27 210/167.12 |
| 2003/0141232 A1* | 7/2003 | Queirel | ................ | E04H 4/1272 210/416.2 |
| 2003/0205537 A1* | 11/2003 | Leaverton | ............... | C02F 1/004 210/767 |
| 2004/0031738 A1* | 2/2004 | Harris-Griffin | ....... | E04H 4/1272 210/416.2 |
| 2004/0074831 A1* | 4/2004 | Mhoon | ................. | E04H 4/1272 210/167.19 |
| 2004/0104163 A1* | 6/2004 | Leaverton | ................. | C02F 1/00 210/237 |
| 2004/0182766 A1* | 9/2004 | Kelty | .................... | E04H 4/1272 210/167.12 |
| 2004/0205886 A1* | 10/2004 | Goettl | .................... | E04H 4/1272 4/507 |
| 2005/0000012 A1* | 1/2005 | Stetson | ................ | E04H 4/1272 4/508 |
| 2005/0235408 A1* | 10/2005 | Stetson | ................ | E04H 4/1272 210/538 |
| 2006/0070935 A1* | 4/2006 | Brosemer | ............. | E04H 4/1272 4/490 |

(56) References Cited

U.S. PATENT DOCUMENTS

| | | | |
|---|---|---|---|
| 2006/0124521 A1* | 6/2006 | Hodak | E04H 4/1272 4/490 |
| 2006/0163132 A1* | 7/2006 | Kelty | E04H 4/1272 210/776 |
| 2006/0260035 A1* | 11/2006 | Baker | E04H 4/1272 4/507 |
| 2006/0289344 A1* | 12/2006 | Queirel | E04H 4/169 210/167.1 |
| 2007/0039859 A1* | 2/2007 | King | E04H 4/1636 210/97 |
| 2007/0045163 A1* | 3/2007 | Meincke | C02F 1/004 210/167.1 |
| 2007/0163933 A1* | 7/2007 | Goggin | E04H 4/1272 210/167.13 |
| 2007/0175808 A1* | 8/2007 | Duckett | E04H 4/1272 210/167.19 |
| 2007/0187311 A1* | 8/2007 | Braun | E04H 4/1272 4/490 |
| 2008/0073257 A1* | 3/2008 | Foley | E04H 4/1272 210/167.13 |
| 2008/0098507 A1* | 5/2008 | Pellington | E04H 4/1272 4/507 |
| 2008/0099386 A1* | 5/2008 | Pellington | E04H 4/1272 4/490 |
| 2008/0099387 A1* | 5/2008 | Pellington | E04H 4/1272 210/167.1 |
| 2008/0216877 A1* | 9/2008 | Lawson | E04H 4/0025 4/490 |
| 2008/0272039 A1* | 11/2008 | Tak | E04H 4/1272 210/167.13 |
| 2009/0120857 A1* | 5/2009 | Bair | E04H 4/14 210/167.1 |
| 2009/0139019 A1* | 6/2009 | Shebek | E04H 4/1272 4/506 |
| 2009/0159516 A1* | 6/2009 | Andrei | E04H 4/1272 210/167.12 |
| 2010/0084325 A1* | 4/2010 | Parks | E04H 4/1272 210/167.12 |
| 2010/0125942 A1* | 5/2010 | Nelson | E04H 4/1272 4/490 |
| 2010/0230336 A1* | 9/2010 | Davies | E04H 4/1263 210/167.2 |
| 2010/0314328 A1* | 12/2010 | Bizon | E03D 1/30 210/744 |
| 2011/0284440 A1* | 11/2011 | De Souza Sisson | C02F 1/001 210/167.12 |
| 2012/0248045 A1* | 10/2012 | Prendergast | E04H 4/1272 210/776 |
| 2012/0305498 A1* | 12/2012 | Palmer | E04H 4/1272 210/776 |
| 2014/0076814 A1* | 3/2014 | Monzingo | E04H 4/1209 210/663 |
| 2014/0209546 A1* | 7/2014 | Smith | E04H 4/1272 210/776 |
| 2014/0263101 A1* | 9/2014 | Voss Weyman | E04H 4/1272 210/776 |
| 2015/0068961 A1* | 3/2015 | Zars | E04H 4/1272 210/167.11 |
| 2015/0354242 A1* | 12/2015 | Saccoccio | B01D 29/50 210/806 |
| 2016/0028183 A1* | 1/2016 | Koller | H01R 13/5219 439/283 |
| 2016/0222687 A1* | 8/2016 | Smith | B01D 29/35 |
| 2016/0230407 A1* | 8/2016 | Voss Weyman | E04H 4/1272 |
| 2016/0251866 A1* | 9/2016 | Greenwald | E04H 4/1272 210/167.19 |
| 2016/0289986 A1* | 10/2016 | Baab | E04H 4/1272 |
| 2016/0305143 A1* | 10/2016 | Hatlen | E04H 4/1272 |
| 2016/0326762 A1* | 11/2016 | Goettl | E04H 4/1272 |
| 2017/0030099 A1* | 2/2017 | Vogtner | E04H 4/1272 |
| 2017/0044785 A1* | 2/2017 | Angelino | E04H 4/1272 |
| 2017/0101795 A1* | 4/2017 | Coughlin | E04H 4/1272 |
| 2017/0101796 A1* | 4/2017 | Goettl | E04H 4/1272 |
| 2017/0175410 A1* | 6/2017 | Smith | E04H 4/1272 |
| 2017/0184233 A1 | 6/2017 | Beagen, Jr. | |
| 2017/0350149 A1* | 12/2017 | Smith | B01D 29/35 |
| 2018/0142484 A9* | 5/2018 | Smith | E04H 4/1263 |
| 2018/0147507 A1* | 5/2018 | Angelino | B01D 29/11 |
| 2018/0179771 A1* | 6/2018 | Greenwald | E04H 4/1272 |
| 2018/0222770 A1* | 8/2018 | Poirier | C02F 1/004 |
| 2018/0223554 A1* | 8/2018 | Amico | E04H 4/16 |
| 2018/0251993 A1* | 9/2018 | Irvine | B65G 15/60 |
| 2018/0283027 A1* | 10/2018 | Huang | B01D 35/05 |
| 2018/0328058 A1* | 11/2018 | Smith | E04H 4/1272 |
| 2019/0085578 A1* | 3/2019 | Smith | B01D 29/35 |
| 2019/0262748 A1* | 8/2019 | McKain | F16L 55/24 |
| 2019/0284826 A1* | 9/2019 | Gu | E04H 4/1209 |
| 2019/0360227 A1* | 11/2019 | Jackson | C02F 1/40 |
| 2020/0141146 A1* | 5/2020 | Smith | E04H 4/1272 |
| 2020/0240163 A1* | 7/2020 | Cabrera | E04H 4/14 |
| 2020/0284059 A1* | 9/2020 | Jackson | E04H 4/1272 |
| 2020/0308856 A1* | 10/2020 | Ramos | E04H 4/1272 |
| 2020/0347629 A1* | 11/2020 | Jackson | C02F 1/40 |
| 2020/0370320 A1* | 11/2020 | Willwater | E04H 4/1272 |
| 2020/0392749 A1* | 12/2020 | Schmidt | E04H 4/1272 |
| 2020/0392750 A1* | 12/2020 | Schmidt | E04H 4/1272 |
| 2020/0392751 A1* | 12/2020 | Schmidt | E04H 4/1272 |
| 2021/0010989 A1* | 1/2021 | Yizhack | G01N 21/6486 |
| 2021/0039022 A1* | 2/2021 | Aquilina | E04H 4/1272 |
| 2021/0062527 A1* | 3/2021 | Schmidt | E04H 4/1263 |
| 2021/0095489 A1* | 4/2021 | Willwater | E04H 4/1272 |
| 2021/0131132 A1 | 5/2021 | Blanc Tailleur et al. | |
| 2021/0189753 A1* | 6/2021 | Schmidt | E04H 4/1272 |
| 2021/0283534 A1* | 9/2021 | Renken | E04H 4/1272 |
| 2022/0025668 A1* | 1/2022 | Schmidt | E04H 4/1272 |
| 2022/0049515 A1* | 2/2022 | Barnes | E04H 4/1272 |
| 2022/0055922 A1* | 2/2022 | Mendez | C02F 1/281 |
| 2022/0258091 A1* | 8/2022 | Henderson | B01D 29/52 |
| 2022/0372781 A1* | 11/2022 | Pugliese | E04H 4/1272 |
| 2023/0108937 A1* | 4/2023 | Perez | B01D 35/02 210/167.1 |
| 2023/0220693 A1* | 7/2023 | Owens | C02F 1/40 210/167.1 |
| 2023/0220694 A1* | 7/2023 | Spykerman | E04H 4/1272 210/167.19 |
| 2023/0220695 A1* | 7/2023 | Owens | E04H 4/1272 222/1 |

\* cited by examiner

SKIMMER COVER ASSEMBLY

TECHNICAL FIELD

This disclosure relates generally to a skimmer cover assembly, and more particularly to an adjustable skimmer cover assembly for use with a swimming pool.

BACKGROUND

This section provides background information related to the present disclosure and is not necessarily prior art. Conventional swimming pools usually include a skimmer assembly for allowing movement of water from the pool into the skimmer assembly. The skimmer assembly often includes an inlet to a filtration system that is powered by an in-line filter pump. Most skimmer assemblies also include a removable lid or cover that, when removed, allows a user to access an interior of the skimmer assembly for repair, cleaning, and/or other purposes, and, when assembled, prevents inadvertent entry of debris and other material into the interior of the skimmer assembly.

When the skimmer assembly is assembled with the pool construction, it is usually desirable for an upper surface of the cover to be flush with an upper surface of a patio or other suitable construct surrounding the pool, and for outer edges of the cover to be aligned with, or face, certain outer edges of the construct surrounding the pool. While known skimmer assemblies and covers for skimmer assemblies have proven acceptable for their intended purposes, there remains a continuous need for improvement in the relevant art.

SUMMARY

This section provides a general summary of the disclosure, and is not a comprehensive disclosure of its full scope or all of its features.

One aspect of the disclosure provides a skimmer assembly. The skimmer assembly includes a housing, a base member, and a carriage. The housing includes a plurality of walls defining a chamber. The base member includes a first sidewall and a first hub. The first sidewall extends from an upper surface of the base member. The first hub extends from a lower surface of the base member. The lower surface is opposite the upper surface. The base member is configured to receive the housing such that the first sidewall at least partially surrounds the housing. The carriage includes a second sidewall and a second hub. The second sidewall extends from an upper surface of the carriage. The first hub extends from a lower surface of the carriage opposite the upper surface of the carriage. The first hub is configured to rotatably receive the second hub.

Implementations of the disclosure may include one or more of the following optional features. In some implementations, the first hub surrounds a portion of the upper surface of the carriage. The second hub may include an end configured to slidably engage the portion of the upper surface of the carriage.

In some implementations, the first hub includes an outer surface defining a first diameter. The second hub may include an inner surface defining a second diameter. The first diameter may be substantially equal to the second diameter.

In some implementations, the base member defines a first hole surrounded by the first hub. The carriage may define a second hole surrounded by the second hub. The chamber may be accessible through the first hole and the second hole.

In some implementations, the second sidewall includes an outer surface having a flange. The flange may include a lower surface extending orthogonal to the second sidewall. The flange may define a wedge shape extending from the second sidewall.

In some implementations, the skimmer assembly includes a cover. The carriage may be configured to removably receive the cover. The second sidewall may at least partially surround the cover. The second sidewall may include an end opposite the upper surface of the carriage. The end may be flush with the upper surface of the carriage.

Another aspect of the disclosure provides a method of assembling a skimmer assembly. The method includes providing a housing including a plurality of walls defining a chamber. The method also includes coupling a base member to the plurality of walls. The base member may include a first hub. The method may further include coupling a carriage to the base member. The carriage may include a base wall, a second hub extending from the base wall in a first direction, and a sidewall extending from the base wall in a second direction opposite the first direction. The method may further include rotating the second hub within the first hub to change an orientation of the sidewall relative to the housing.

This aspect may include one or more of the following optional features. In some implementations, the method includes sliding an end of the first hub along an upper surface of the carriage.

In some implementations, the first hub includes an outer surface, and the second hub includes an inner surface. The method may further include sliding the outer surface along the inner surface while rotating the second hub within the first hub.

In some implementations, the method includes disposing the skimmer assembly within a swimming pool construct having an edge facing the sidewall. Rotating the second hub within the first hub may include orienting the sidewall in a parallel orientation to the edge. The sidewall may include an outer surface having a flange. The flange and the edge may define a gap visible along a line of sight extending in the first direction. The method may further include rotating the second hub within the first hub such that the gap is not visible along the line of sight. The method may further include engaging an entirety of the flange with the swimming pool construct.

In some implementations, the method includes coupling a cover to the carriage such that an end of the sidewall is flush with an upper surface of the cover.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Figure 1:
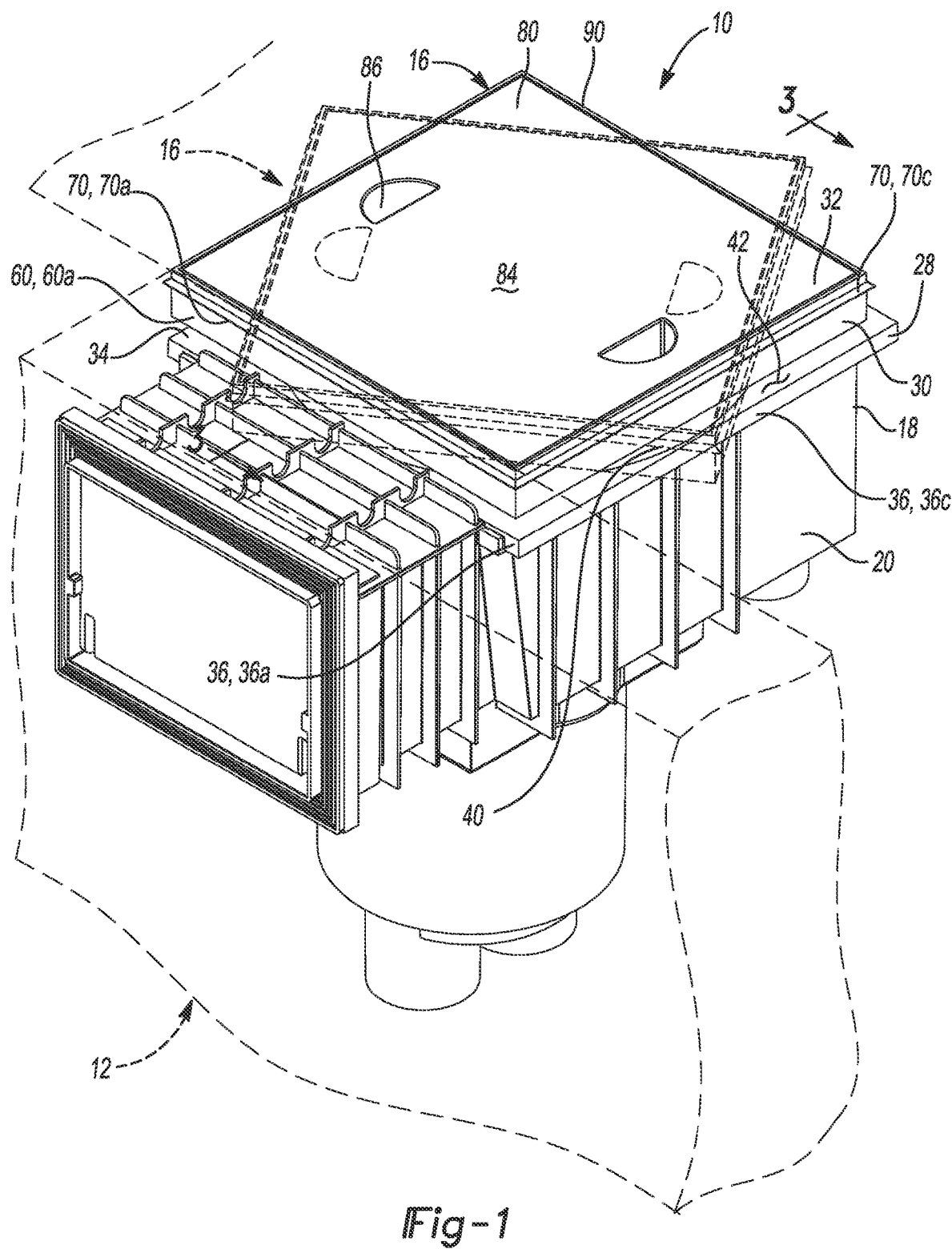
FIG. 1 is a perspective view of a skimmer assembly assembled with a swimming pool construct in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a skimmer assembly 10 is shown. As will be explained in more detail below, the skimmer assembly 10 may be utilized with, or assembled with, a swimming pool construct 12 in order to perform various functions relative to the water in the pool construct 12. For example, the skimmer assembly 10 maybe used to fill, chlorinate, remove debris, or perform other maintenance-related functions relative to the water in the pool construct 12.

The skimmer assembly 10 may include a housing assembly 14 and a cover assembly 16. In an assembled configuration, the cover assembly 16 may be removably coupled to the housing assembly 14, such that removing the cover assembly 16 from the housing assembly 14 allows a user to access various components within the housing assembly 14.

Figure 2:
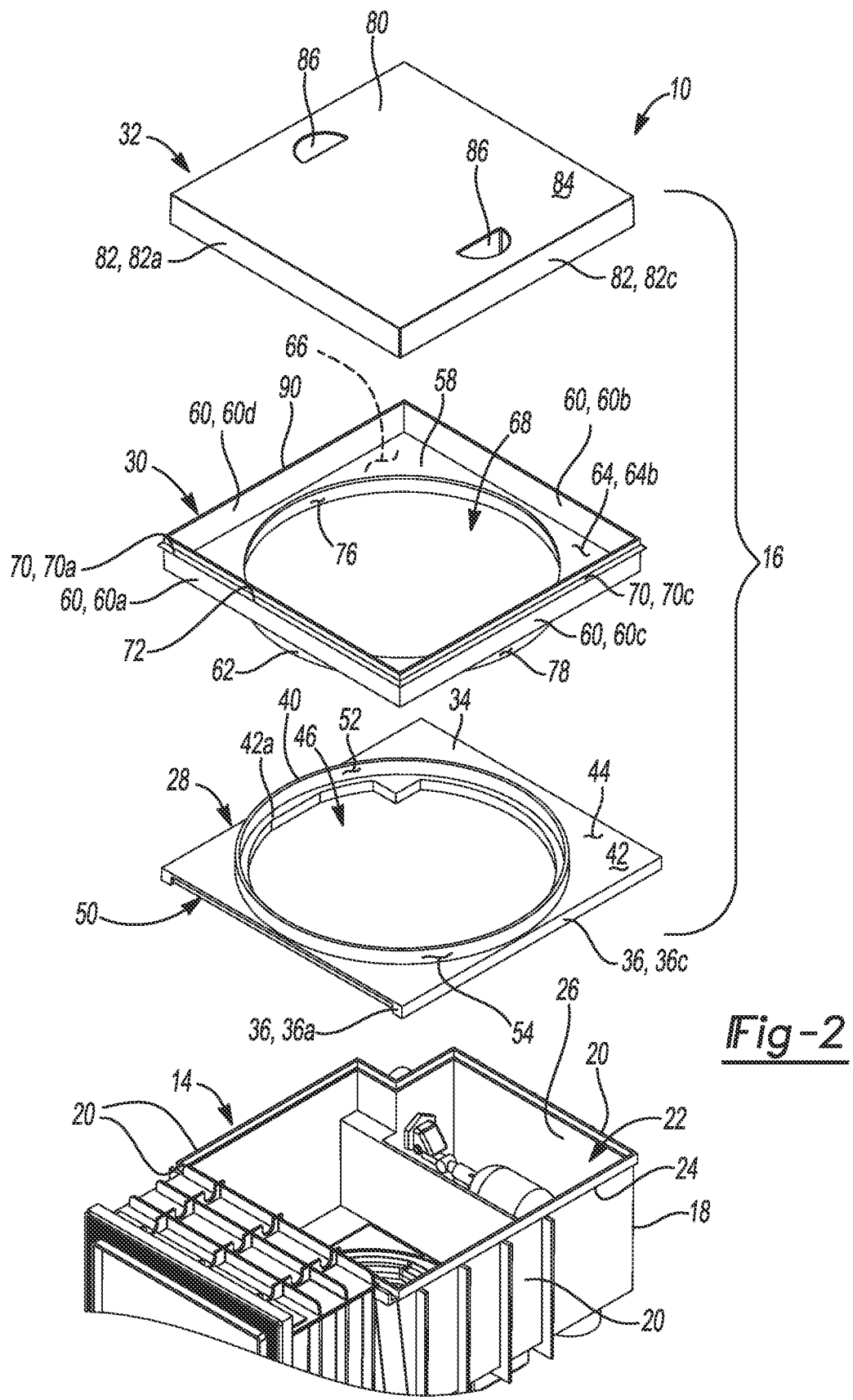
FIG. 2 is an exploded view of a cover assembly of the skimmer assembly of FIG. 1 in accordance with the principles of the present disclosure.

As illustrated in FIG. 2, the housing assembly 14 may include a housing 18 having one or more walls 20 defining a chamber 22. An upper end 24 of the one or more walls 20 may form or otherwise define an opening 26 into, and in fluid communication with, the chamber 22.

Figure 3:
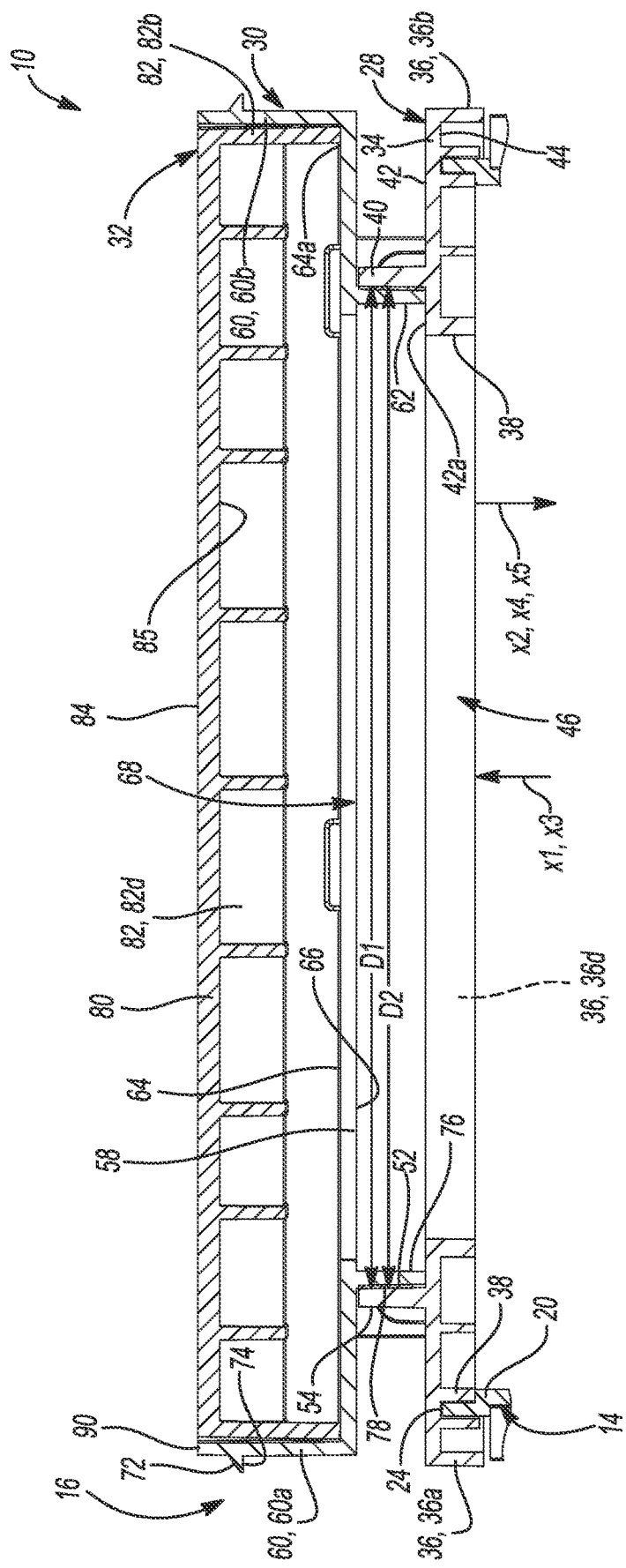
FIG. 3 is a cross-sectional view of the skimmer assembly of FIG. 1 taken through the line 3-3 of FIG. 1.

With reference to FIGS. 2 and 3, the cover assembly 16 may include a base 28, a carriage 30, and a cover 32. The base 28 may include an upper wall 34, one or more outer sidewalls 36, one or more inner sidewalls 38, and a hub 40. The upper wall 34 may include an upper surface 42 and a lower surface 44 opposite the upper surface 42. The upper surface 42 and the lower surface 44 may define a hole 46 through the upper and lower surfaces 42, 44. In the assembled configuration, the hole 46 can allow a user to access the chamber 22 of the housing 18.

The outer sidewalls 36 of the base 28 may extend in a first direction X1 from the upper wall 34. In some implementations, the first direction X1 is substantially (e.g., +/−five degrees) perpendicular to the upper and/or lower surfaces 42, 44. Each of the outer sidewalls 36 may be coupled to, and extend from, an adjacent sidewall 36, such that the sidewalls 36 surround at least a portion of the upper wall 34.

In some implementations, the sidewalls 36 include a front sidewall 36a, a rear sidewall 36b opposite the front sidewall 36a, a first lateral sidewall 36c extending between the front sidewall 36a and the rear sidewall 36b, and a second lateral sidewall 36d (opposite the first lateral sidewall 36c) extending between the front sidewall 36a and the rear sidewall 36b. In this regard, the sidewalls 36a-36d may define a portion of a substantially rectangular shaped construct. It will be appreciated, however, that the base 28 may include more or less than four sidewalls 36 defining various other shapes within the scope of the present disclosure. In this regard, the number of, and shape formed by, the sidewalls 36 may correspond to the number of, and shape formed by, the walls 20 of the housing 18. In some implementations, the front sidewall 36a defines an opening 50. In the assembled configuration, the opening 50 may receive a wall 20 of the housing 18.

The hub 40 may extend from the upper surface 42 in a second direction X2 and may include an inner surface 52 and an outer surface 54 opposite the inner surface 52. The second direction X2 may be opposite the first direction X1. In some implementations, the inner surface 52 and the outer surface 54 each define a substantially circular shape such that the hub 40 defines a cylinder. In this regard, the inner surface 52 may define a first diameter D1. The hub 40 (e.g., the inner surface 52) may surround a portion 42a of the upper surface 42, such that the portion 42a of the upper surface 42 forms a ledge extending from the hole 46 to the inner surface 52 of the hub 40.

The carriage 30 may include a base 58, one or more sidewalls 60, and a hub 62. The base 58 may include an upper surface 64 and a lower surface 66 opposite the upper surface 64. The upper surface 64 and the lower surface 66 may define a hole 68 through the upper and lower surfaces 64, 66. In the assembled configuration, the hole 68 may be aligned with the hole 46 of the base 28 to allow a user to access the chamber 22 of the housing 18.

The sidewalls 60 of the carriage 30 may extend in a third direction X3 from the base 58. In some implementations, the third direction X3 is substantially (e.g., +/−five degrees) perpendicular to the upper and/or lower surfaces 64, 66. Each of the sidewalls 60 may be coupled to, and extend from, an adjacent sidewall 60, such that the sidewalls 60 surround at least a portion of the base 58. In some implementations, the sidewalls 60 include a front sidewall 60a, a rear sidewall 60b opposite the front sidewall 60a, a first lateral sidewall 60c extending between the front sidewall 60a and the rear sidewall 60b, and a second lateral sidewall 60d (opposite the first lateral sidewall 60c) extending between the front sidewall 60a and the rear sidewall 60b. In this regard, the sidewalls 60a-60d may define a portion of a substantially rectangular shaped (e.g., square) construct. It will be appreciated, however, that the carriage 30 may include more or less than four sidewalls 60 defining various other shapes within the scope of the present disclosure. In this regard, the number of, and shape formed by, the sidewalls 60 may correspond to the shape formed by the cover 32.

The sidewalls 60 may surround a portion 64a of the upper surface 64. In particular, the portion 64a of the upper surface 64 may form a ledge extending from the hole 68 to the sidewalls 60. As will be explained in more detail below, in the assembled configuration, the portion 64a of the upper surface 64 may support (e.g., engage) the cover 32.

At least one of the sidewalls 60 may include a flange 70. For example, in some implementations, the front sidewall 60a includes a front flange 70a, the rear sidewall 60b includes a rear flange 70b extending from the front flange 70a, the first lateral sidewall 60c includes a first lateral flange 70c extending from the front flange 70a to the rear flange 70b, and the second lateral sidewall 60d includes a second lateral flange 70d extending from the front flange 70a to the rear flange 70b.

Each flange 70 may include an upper surface 72 and a lower surface 74. The lower surface 74 may extend from the respective sidewall 60 in a direction substantially (e.g., +/−5 degrees) perpendicular to the third direction X3, while the upper surface 72 may extend from the respective sidewall 60 at an angle between zero degrees and ninety degrees. In some implementations, the angle at which the upper surface 72 extends from the respective sidewall 60 is substantially (e.g., +/−ten degrees) equal to forty-five degrees, such that the flange 70 forms a wedge shape extending from the sidewalls 60.

As will be explained in more detail below, in the assembled configuration, the lower surface 74 of the flange 70 can face and/or engage a portion of the pool construct 12 surrounding the skimmer assembly 10, while upper surface 72 can form a gradual transition to the portion of the pool construct 12 surrounding the skimmer assembly 10. In some implementations, the flange 70 spans a gap defined between the sidewall(s) 60 and the portion of the pool construct 12 surrounding the skimmer assembly 10.

The hub 62 may extend from the lower surface 66 in a fourth direction X4 and may include an inner surface 76 and an outer surface 78 opposite the inner surface 76. The fourth direction X4 may be opposite the third direction X3. In some implementations, the inner surface 76 and the outer surface 78 each define a substantially circular shape such that the hub 62 defines a cylinder. In this regard, the outer surface 78 may define a second diameter D2. The second diameter D2 may be substantially equal to (e.g., slightly smaller than and/or between 90% and 99.9% of), the first diameter D1 defined by the inner surface 52 of the hub 40 such that, in the assembled configuration, the hub 62 is received within the hub 40. In particular, as will be described in more detail below, the second diameter D2 may be sized such that the hub 62 can rotate within, and translate in the third and/or fourth directions X3, X4 relative to, the hub 40.

While the hub 62 is shown and described herein as being sized such that the hub 62 is rotatably disposed within the hub 40, it will be appreciated that, conversely, the hub 62 may be sized such that the hub 40 is rotatably disposed within the hub 62. A portion 66a of the lower surface 66 may surround the hub 62. In particular, the portion 66a of the lower surface 66 may form a ledge extending from an outermost edge of the base 58 to the outer surface 78 of the hub 62.

The cover 32 may include a base wall 80 and sidewalls 82 extending from the base wall 80. As previously described, the cover 32, including the base wall 80 and the sidewalls 82, may be sized and shaped such that the cover 32 is received by the carriage 30 in the assembled configuration.

The base wall 80 may include an upper surface 84 and a lower surface 85 opposite the upper surface 84. The upper surface 84 may define one or more apertures 86 to allow a user to engage and remove the cover 32 from the carriage 30 in the assembled configuration in order to access the chamber 22 of the housing 18.

The sidewalls 82 of the cover 32 may extend in a fifth direction X5 from the base wall 80. In some implementations, the fifth direction X5 is substantially (e.g., +/−five degrees) perpendicular to the upper surface 84. Each of the sidewalls 82 may be coupled to, and extend from, an adjacent sidewall 82, such that the sidewalls 82 surround at least a portion of the base wall 80.

In some implementations, the sidewalls 82 include a front sidewall 82a, a rear sidewall 82b opposite the front sidewall 82a, a first lateral sidewall 82c extending between the front sidewall 82a and the rear sidewall 82b, and a second lateral sidewall 82d (opposite the first lateral sidewall 82c) extending between the front sidewall 82a and the rear sidewall 82b. In this regard, the sidewalls 82a-82d may define a portion of a substantially rectangular shaped construct. It will be appreciated, however, that the cover 32 may include more or less than four sidewalls 82 defining various other shapes within the scope of the present disclosure. In this regard, as previously described, the number of, and shape formed by, the sidewalls 82 may correspond to the shape formed by sidewalls 60 of the carriage 30.

In some implementations, a length of the sidewalls 82 extending from the upper surface 84 of the cover 32 in the direction X5 is substantially (e.g., +/−five percent) equal to a length of the sidewalls 60 extending from the upper surface 64 of the carriage 30 in the direction X3 such that, in the assembled configuration, the upper surface 84 of the cover 32 is aligned (e.g., flush) with an end 90 of the sidewalls 60. In particular, the upper surface 84 may be coplanar with the end 90 of the sidewalls.

With reference to FIG. 3, in the assembled configuration, the base 28 of the cover assembly 16 may be coupled to the housing assembly 14. For example, the walls 20 of the housing 18 may be received between the inner and outer sidewalls 36, 38 of the base 28. The carriage 30 may be coupled to the base 28. For example, as previously described, the hub 62 may be rotatably received within the hub 40. In some implementations, the hub 40 may slidably engage the portion 66a of the lower surface 66 surrounding the hub 62, and/or the hub 62 may slidably engage the portion 38a of the upper surface 42 of the base 28. The cover 32 may be coupled to the carriage 30 such that the sidewalls 82 of the cover 32 engage the portion 64a of the upper surface 64 of the carriage 30.

Figure 4A:
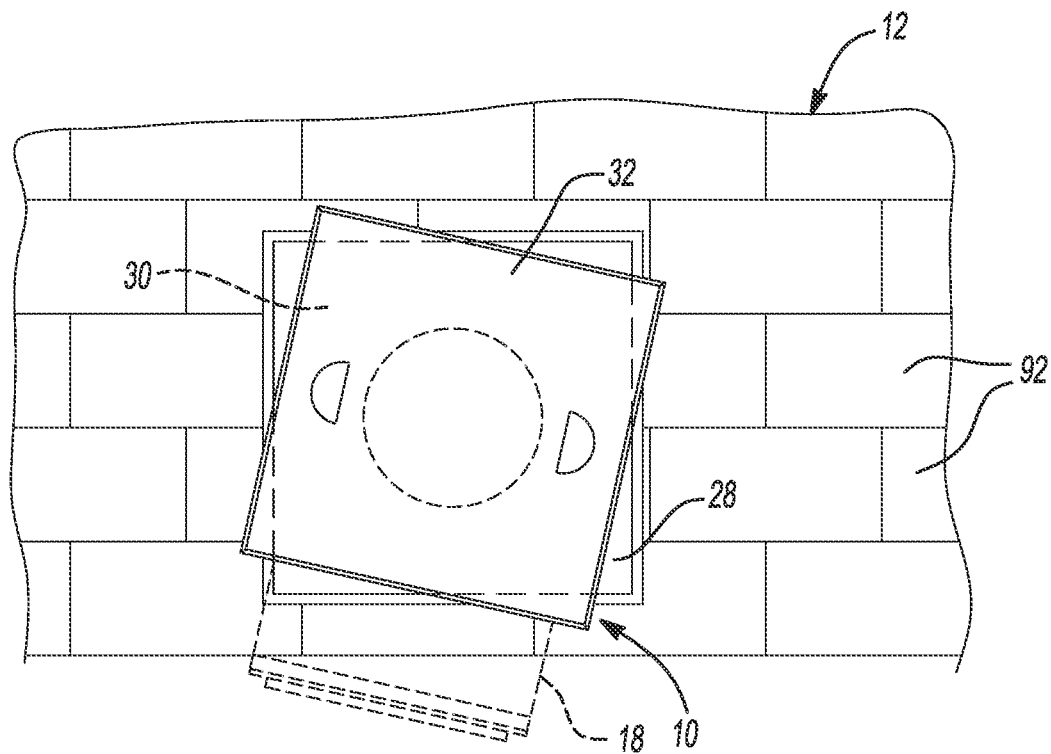
FIG. 4A is a top view of the skimmer assembly of FIG. 1 with a cover assembly in a first orientation.
Figure 4B:
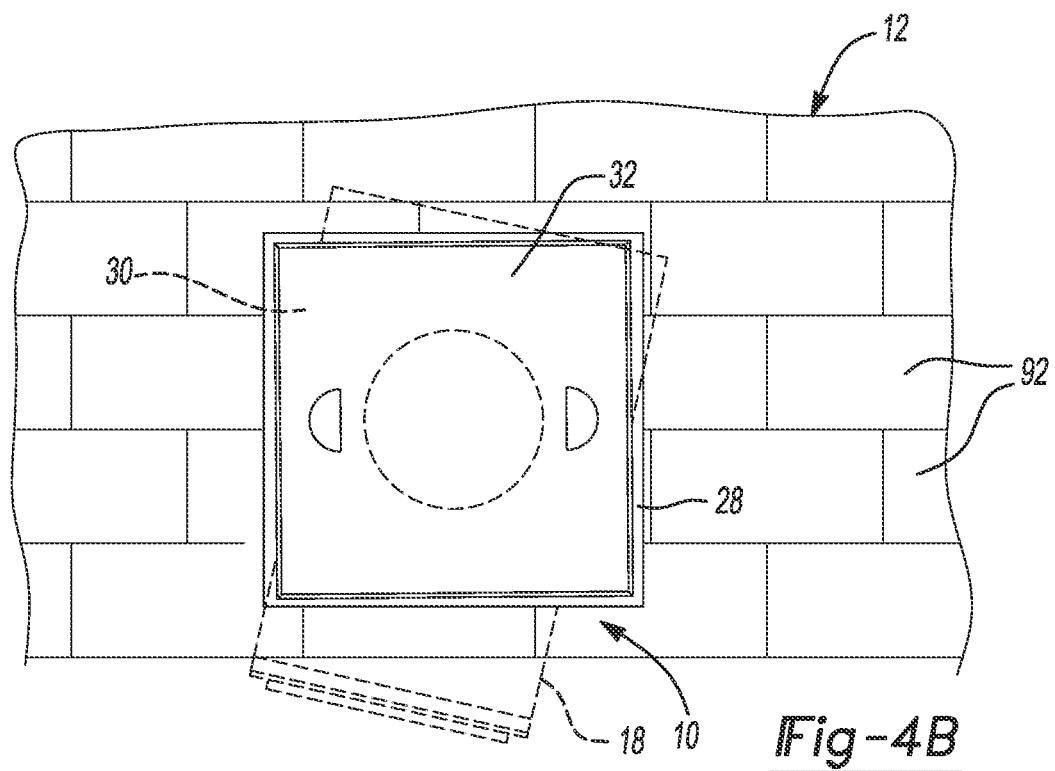
FIG. 4B is a top view of the skimmer assembly of FIG. 1 with a cover assembly in a second orientation.

A method of using the cover assembly 16 will be described with reference to FIGS. 4A and 4B. During use of the cover assembly 16, a user may assemble the cover assembly 16 (e.g., the base 28) to the housing assembly 14, in the manner previously described, within the pool construct 12. As illustrated in FIG. 4A, in some implementations, a portion of a patio (e.g., patio stones 92) may be disposed around the cover assembly 16 such that one or more of the sidewalls 60 of the carriage 30 face a corresponding sidewall of an adjacent patio stone 92 in a non-parallel orientation such that a gap 94 is visible between at least one of the flanges 70 and a corresponding adjacent patio stone 92 when viewed along a line of sight parallel to the direction X5.

In a subsequent step of using the cover assembly 16, the user may rotate the carriage 30 relative to the base 28 such that one or more of the sidewalls 60 of the carriage 30 are parallel to the corresponding sidewall of an adjacent patio stone 92 facing the sidewall 60. For example, the user may rotate the carriage 30 such that the first sidewall 60a is parallel to the sidewall of an adjacent patio stone 92 facing the sidewall 60a, the second sidewall 60b is parallel to the sidewall of an adjacent patio stone 92 facing the sidewall 60b, the third sidewall 60c is parallel to the sidewall of an adjacent patio stone 92 facing the sidewall 60c, and the fourth sidewall 60d is parallel to the sidewall of an adjacent patio stone 92 facing the sidewall 60d. Similarly, an entirety of the lower surface 74 of each flange 70a-70d may engage and/or face an upper surface of the corresponding adjacent patio stone 92 such that the gap 94 is not visible between at the flanges 70a-70d and the corresponding adjacent patio stone 92 when viewed along the line of sight parallel to the direction X5. In this way, the user is able to improve the aesthetic and functional characteristics of the skimmer assembly 10 relative to the pool construct 12.

The following Clauses provide an exemplary configuration for a skimmer assembly and related methods, as described above.

Clause 1: A skimmer assembly comprising: a housing including a plurality of walls defining a chamber; a base member including a first sidewall and a first hub, the first sidewall extending from an upper surface of the base member, the first hub extending from a lower surface of the base member opposite the upper surface, the base member configured to receive the housing such that the first sidewall at least partially surrounds the housing; and a carriage including a second sidewall and a second hub, the second sidewall extending from an upper surface of the carriage, the first hub extending from a lower surface of the carriage opposite the upper surface of the carriage, the first hub configured to rotatably receive the second hub.

Clause 2: The skimmer assembly of Clause 1, wherein the first hub surrounds a portion of the upper surface of the carriage, and wherein the second hub includes an end configured to slidably engage the portion of the upper surface of the carriage.

Clause 3: The skimmer assembly of any of Clauses 1 through 2, wherein the first hub includes an outer surface defining a first diameter, and the second hub includes an inner surface defining a second diameter.

Clause 4: The skimmer assembly of Clause 3, wherein the first diameter is substantially equal to the second diameter.

Clause 5: The skimmer assembly of any of Clauses 1 through 4, wherein the base member defines a first hole surrounded by the first hub, and the carriage defines a second hole surrounded by the second hub.

Clause 6: The skimmer assembly of Clause 5, wherein the chamber is accessible through the first hole and the second hole.

Clause 7: The skimmer assembly of any of Clauses 1 through 6, wherein the second sidewall includes an outer surface having a flange.

Clause 8: The skimmer assembly of Clause 7, wherein the flange includes a lower surface extending orthogonal to the second sidewall.

Clause 9: The skimmer assembly of any of Clauses 7 through 8, wherein the flange defines a wedge shape extending from the second sidewall.

Clause 10: The skimmer assembly of any of Clauses 1 through 9, further comprising a cover, wherein the carriage is configured to removably receive the cover.

Clause 11: The skimmer assembly of Clause 10, wherein the second sidewall at least partially surrounds the cover.

Clause 12: The skimmer assembly of Clause 11, the second sidewall includes an end opposite the upper surface of the carriage, and wherein the end is flush with the upper surface of the carriage.

Clause 13: A method of assembling a skimmer assembly, the method comprising: providing a housing including a plurality of walls defining a chamber; coupling a base member to the plurality of walls, the base member including a first hub; coupling a carriage to the base member, the carriage including a base wall, a second hub extending from the base wall in a first direction, and a sidewall extending from the base wall in a second direction opposite the first direction; and rotating the second hub within the first hub to change an orientation of the sidewall relative to the housing.

Clause 14: The method of Clause 13, further comprising sliding an end of the first hub along an upper surface of the carriage.

Clause 15: The method of any of Clauses 13 through 14, wherein the first hub includes an outer surface, and the second hub includes an inner surface, the method further comprising sliding the outer surface along the inner surface while rotating the second hub within the first hub.

Clause 16: The method of any of Clauses 13 through 15, further comprising disposing the skimmer assembly within a swimming pool construct having an edge facing the at least one sidewall.

Clause 17: The method of Clause 16, wherein rotating the second hub within the first hub includes orienting the sidewall in a parallel orientation to the edge.

Clause 18: The method of Clause 17, wherein the sidewall includes an outer surface having a flange, and wherein the flange and the edge define a gap visible along a line of sight extending in the first direction, the method further comprising rotating the second hub within the first hub such that the gap is not visible along the line of sight.

Clause 19: The method of Clause 18, further comprising engaging an entirety of the flange with the swimming pool construct.

Clause 20: The method of any of Clauses 13 through 19, further comprising coupling a cover to the carriage such that an end of the sidewall is flush with an upper surface of the cover.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A skimmer assembly comprising:
a housing including a plurality of walls defining a chamber;
a base member coupled to the housing and including a first sidewall and a first hub, the first sidewall extending from an upper surface of the base member, the first hub extending from a lower surface of the base member opposite the upper surface; and a carriage including a second sidewall and a second hub, the second sidewall extending from an upper surface of the carriage, the first hub extending from a lower surface of the carriage opposite the upper surface of the carriage and rotatably receiving the second hub.

2. The skimmer assembly of claim 1, wherein the first hub surrounds a portion of the upper surface of the carriage, and wherein the second hub includes an end configured to slidably engage the portion of the upper surface of the carriage.

3. The skimmer assembly of claim 1, wherein the first hub includes an outer surface defining a first diameter, and the second hub includes an inner surface defining a second diameter.

4. The skimmer assembly of claim 3, wherein the first diameter is substantially equal to the second diameter.

5. The skimmer assembly of claim 1, wherein the base member defines a first hole surrounded by the first hub, and the carriage defines a second hole surrounded by the second hub.

6. The skimmer assembly of claim 5, wherein the chamber is accessible through the first hole and the second hole.

7. The skimmer assembly of claim 1, wherein the second sidewall includes an outer surface having a flange.

8. The skimmer assembly of claim 7, wherein the flange includes a lower surface extending orthogonal to the second sidewall.

9. The skimmer assembly of claim 7, wherein the flange defines a wedge shape extending from the second sidewall.

10. The skimmer assembly of claim 1, further comprising a cover, wherein the carriage removably receives the cover.

11. The skimmer assembly of claim 10, wherein the second sidewall at least partially surrounds the cover.

12. The skimmer assembly of claim 11, the second sidewall includes an end opposite the upper surface of the carriage, and wherein the end is flush with the upper surface of the carriage.

* * * * *